(12) United States Patent
Rossi et al.

(10) Patent No.: US 6,442,316 B1
(45) Date of Patent: Aug. 27, 2002

(54) STRESS SENSOR BASED ON PERIODICALLY INSERTED COLOR-CHANGING TACTILE FILMS TO DETECT MISHANDLING OF FIBER OPTIC CABLES

(75) Inventors: Mike Rossi, Maiden; Nicholas V. Nechitailo, Conover, both of NC (US)

(73) Assignee: Alcatel, Paris (FR)

( * ) Notice: Subject to any disclaimer, the term of this patent is extended or adjusted under 35 U.S.C. 154(b) by 24 days.

(21) Appl. No.: 09/740,938

(22) Filed: Dec. 21, 2000

(51) Int. Cl.[7] ................................................. G02B 6/44
(52) U.S. Cl. ..................... 385/106; 378/102; 378/128
(58) Field of Search ................................ 385/109, 112, 385/113, 100, 102, 103, 106, 124, 126, 127, 128, 11; 65/413; 427/163.1

(56) References Cited

U.S. PATENT DOCUMENTS

| | | |
|---|---|---|
| 4,002,139 A | 1/1977 | Payne |
| 4,138,193 A | 2/1979 | Olszewski et al. ........... 385/114 |
| 4,350,046 A | 9/1982 | Parfree et al. |
| 4,506,948 A | 3/1985 | Parfree et al. |
| 4,990,769 A | 2/1991 | Hazan et al. ........... 250/227.16 |
| 5,282,650 A | 2/1994 | Smith et al. |
| 5,604,318 A | 2/1997 | Fasshauer ............... 73/862.624 |
| 5,605,035 A | 2/1997 | Pethrick et al. |
| 6,108,475 A | 8/2000 | Chapin et al. |
| 6,278,823 B1 * | 8/2001 | Goldner et al. ............. 385/100 |

FOREIGN PATENT DOCUMENTS

| | | |
|---|---|---|
| EP | 924 543 A2 | 6/1999 |
| GB | 2 194 256 A | 3/1988 |

\* cited by examiner

*Primary Examiner*—Robert H. Kim
*Assistant Examiner*—Therese Barber
(74) *Attorney, Agent, or Firm*—Sughrue Mion, PLLC

(57) ABSTRACT

The present invention is a fiber optic cable which uses pressure sensitive films or tactile films in order to detect areas on a fiber optic cable where excessive loads have been applied or experienced. In the present invention, a plurality of strips of tactile film or pressure sensitive film are inserted, at regular intervals, throughout the fiber optic cable structure in a fashion similar to that of swellable tape. The tactile film or pressure sensitive film used can be any color-changing stress sensor which is formed in the shape of a flat strip. The present invention uses strips of tactile or pressure sensitive film of different widths which are inserted periodically throughout the cable, both circumferentially and along the length of the cable. The films are located between the buffer tube(s) and the outer jacket of the cable or between the fibers and the outer jacket of the cable. This intermittent use decreases the overall cost and weight of the cable, over using a continuous length of tactile film. It is also desirable, in the present invention, to have the tactile or pressure sensitive film with corrugated folds along the width of the film. This corrugation provides a much higher sensitivity to loads experienced by the cables due to more "aggressive" deformation of the film during buckling.

22 Claims, 4 Drawing Sheets

STRESS SENSOR BASED ON PERIODICALLY INSERTED COLOR-CHANGING TACTILE FILMS TO DETECT MISHANDLING OF FIBER OPTIC CABLES

BACKGROUND OF THE INVENTION

1. Field of the Invention

The present invention generally relates to the field of fiber optic cables, in particular the present invention is directed to a new and novel method for monitoring load related stresses and factors in fiber optic cables which result in damage to the cable, and more importantly the fibers within the cable.

2. Discussion of Related Art

Optical fibers are very small diameter glass strands which are capable of transmitting an optical signal over great distances, at very high speeds, and with relatively low signal loss as compared to standard wire or cable networks. The use of optical fibers in today's technology has developed into many widespread areas, such as: medicine, aviation, communications, etc. Because of this development, there is a growing need to have fiber optic cables operating with high efficiency with as little signal loss as possible.

An example of a common fiber optic cable cross-section can be seen in FIG. 1. At the center of the cable is a central strength member 1. The central strength member 1 can be made from a number of different materials, such as hard plastic, glass, or a glass reinforced composite and is used as a stiffening member for the cable, as well as supporting the inner sides of the buffer tubes 2. Although FIG. 1 shows three buffer tubes 2, the quantity can increase or decrease depending on the particular application the cable is to be used for. Within each buffer tube 2 is a plurality of individual optical fibers 3. The optical fibers 3 can be configured in any number of ways. For example, within each buffer tube 2 there can be a stacked ribbon configuration (as shown in FIG. 1) where each ribbon has a plurality of individual fibers and there are a number of ribbons. Alternatively, the fibers can be configured as bundles inside the buffer tube. The configuration will greatly depend on the use and application of the cable. Finally, the outer jacket 4 provides protection to the internal components of the cable, while aiding to keep all of the components together. The outer jacket provides protection from the adverse physical elements that a cable can be exposed to during its use and installation.

The various configurations of fiber optic cables allow the transmission of a large amount of information. Unlike the previous electric wires and phone lines, fiber optics uses the transmission of light through optical fibers to transmit data and information. The use of visible and near visible light in the transmission of information can result in data transmission time intervals that are a fraction of what they would normally be if standard data transmission systems were used.

The transmission of information via fiber optics is relatively simple. First an electronic data signal is converted to visible or near visible light. The light is then transmitted through an optical fiber, which has a very pure core of silica glass surrounded by a cladding layer which is silica of a purity level less than that of the core. The difference in purity levels of these two parts of the fiber result in the core and cladding having different Indices of Refraction. This difference in their refractive indices allows the light in the core to be continually reflected back into the core as it travels along the fiber. At the end of the fiber optic cable, the light is converted to whatever form is needed.

This method to transmit data has numerous advantages, over and above the fact that the transmission speed is much faster than in standard wire and cable networks. First, the amount of signal loss over a great distance is much less than that of traditional methods. This means that a lesser amount of input power is needed. Second, optical fibers are not effected by, nor do they generate, electromagnetic fields. This is a significant problem with traditional data transmission methods, requiring significant insulation measures. The use of light practically eliminates these concerns, allowing the fibers to be very small and light weight, allowing for easier and more complex installation.

However, the use of optical fibers is not without its problems. One of the most important concerns when working with optical fibers is their sensitivity to damage during manufacture and installation. Great measures and developments have been made in attempts to protect fibers from damage during these processes. Because optical fibers are made of glass, they are very sensitive to bending or crushing stresses. Often times during manufacture or installation the individual fibers or cables are bent at angles exceeding their allowable bend radius, or are placed under very high crushing loads. Such loads and stresses severely affect the mechanical and optical performance of the fibers.

When fibers are damaged under bending or crushing stresses, the transmitted light does not properly reflect off of the cladding layer at the points of damage. This can result in a dramatic decrease in signal strength in the fiber. Moreover, an even bigger problem is that this damage can go undetected until installation is complete and the fibers are tested. The individual fibers are very small and, as stated above, are often in a cable with an outer jacket so the internal damage can not be seen. This can result in very high costs in removing damaged cables or fibers and re-installing new cables and fibers.

Therefore, there is a strong need for monitoring and visualizing several possible load factors which may be experienced during cable installation or manufacture. There are existing methods to monitor these loads but have disadvantages and drawbacks. The present devices do not provide reliable and easy-to-use means for monitoring these load related factors at a low cost. Some methods use invasive technology which is very time consuming and costly and can itself result in damage to the cable or fibers. Other non-invasive methods are also costly and notoriously unreliable.

SUMMARY OF THE INVENTION

The present invention is directed to eliminating the above problems associated with being unable to detect damaged fibers or cables until installation is complete, thus greatly reducing the overall costs involved in fiber optic cable system installation.

The present invention addresses the above problems by using pressure sensitive films or tactile films in order to detect areas on a fiber optic cable where excessive loads have been applied or experienced. In the present invention, a plurality of long strips of tactile film or pressure sensitive film are inserted, at regular intervals, throughout the fiber optic cable structure in a fashion similar to that of swellable tape. The tactile film or pressure sensitive film used can be any color-changing stress sensor which is formed in the shape of a flat strip. The present invention uses strips of tactile or pressure sensitive film of different widths which are inserted periodically throughout the cable, both circumferentially and along the length of the cable. The films are located between the optical buffer tube(s) and the outer jacket of the cable. This intermittent use decreases the overall cost and weight of the cable, over using a continuous length of tactile film. It is also desirable, in the present invention, to have the tactile or pressure sensitive film with corrugated folds along the width of the film. This corrugation provides a much higher sensitivity to loads experienced by the cables due to more "aggressive" deformation of the film during buckling.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

The present invention will be explained in further detail by making reference to the accompanying drawings, which do not limit the scope of the invention in any way.

Figure 1:
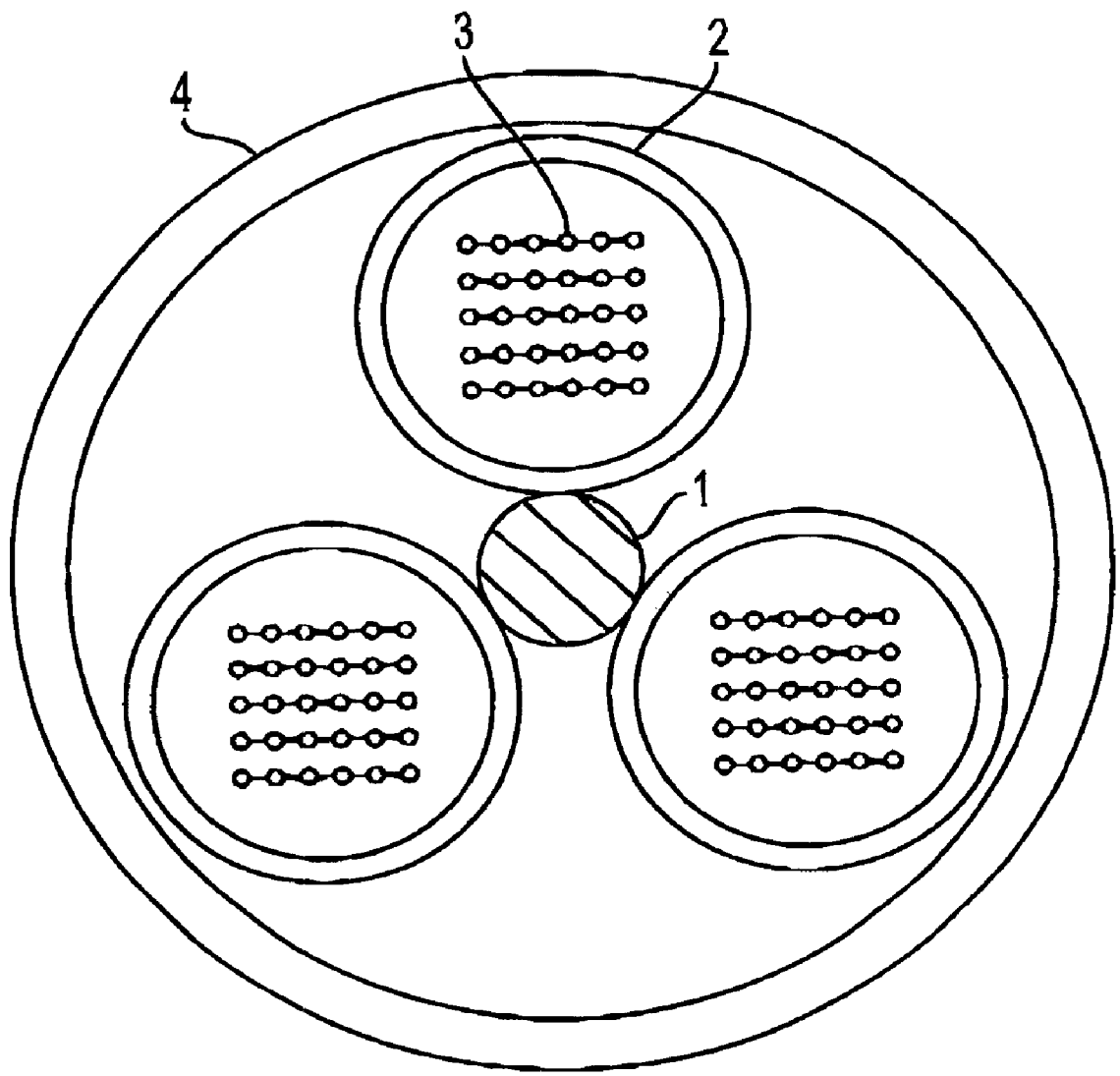
FIG. 1 is a cross-sectional view of a typical fiber optic cable.
Figure 2:
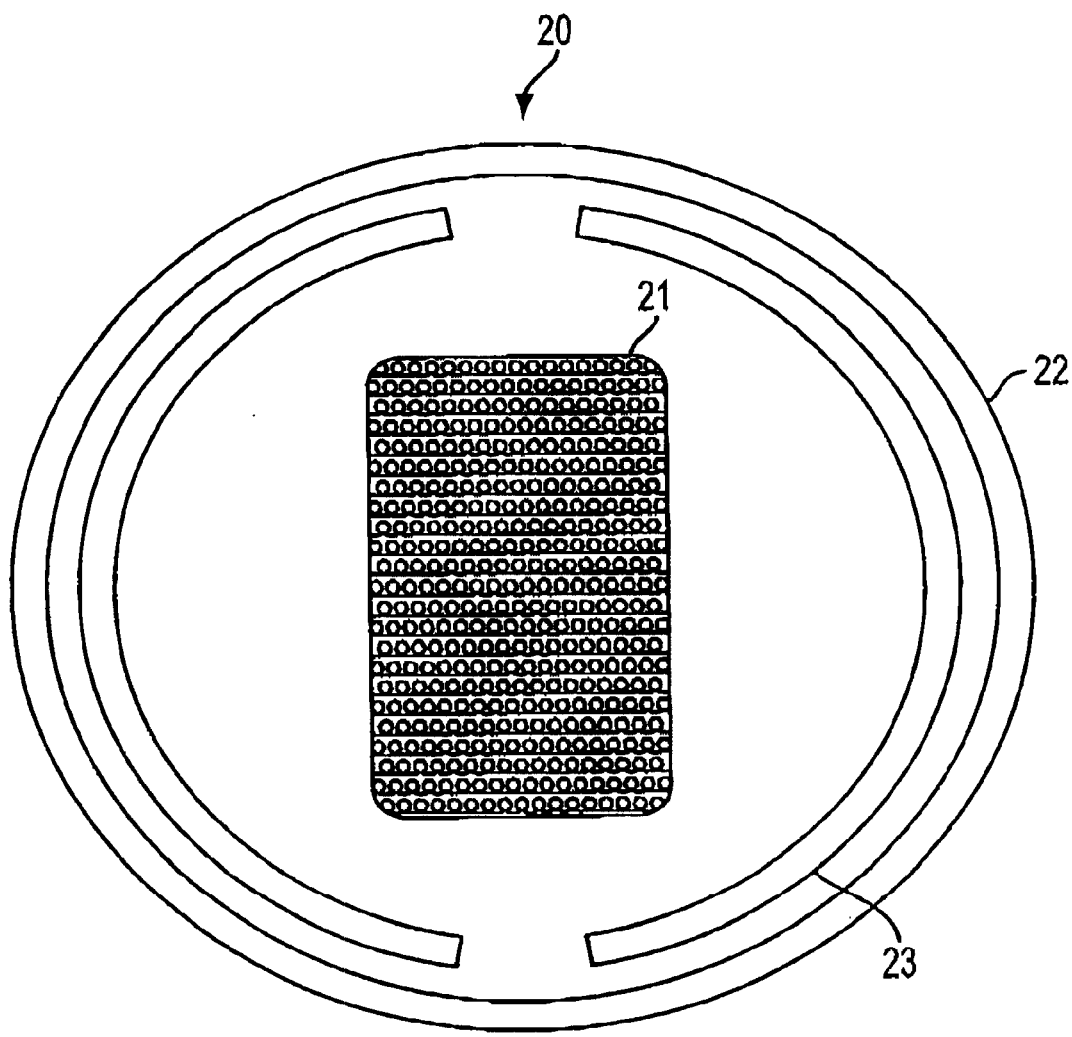
FIG. 2 is a cross-sectional view of a fiber optic cable made in accordance with the present invention with a optical fiber ribbon stack.

Referring to the drawings, FIG. 2 shows an embodiment of the present invention where the fiber optic cable 20 has a single large ribbon stack 21 and an outer jacket 22. The films 23 are located just inside the outer jacket 22 and are positioned radially around the inner circumference of the cable 20. As shown in FIG. 2, the films 23 are positioned intermittently around the inner circumference of the tube, and are not a continuous tube of film. This greatly reduces the costs and complexity of placing the films 23 in the cable 20. In addition to being intermittent along the circumference of the cable 20, the films 23 can be intermittent along the length of the cable 20. That is. it is not necessary for the films 23 to run along the entire length of the cable 20. The length of each of the films 23 can be optimized for each individual application by taking into account the applicable installation parameters and system capabilities. Further, the gaps and spaces both circumferentially and along the length of the cable can be optimized for reduced cost and weight without compromising the overall function of the films 23. Additionally, the width of the films 23 in the cable 20 can vary and be optimized for cost savings and cable application.

The films 23 that can be used in the present invention can be any commonly known or used commercial or specially developed tactile or pressure-sensitive film which changes color under various loads factors, particularly normal pressures or loads. These films change colors at the locations where they are placed under various pressure loads, thus indicating the location of the stresses experienced. Most of these films are made with very small microcapsules of color forming material, and when the film is placed under a load or stress the microcapsules are broken releasing the color forming material. In the preferred embodiment of the present invention, the color intensity of the film at the location of the stress or load will correspond to the level of applied force or pressure.

Additionally, it is desirable for the film 23 to be used to be able to detect pressure ranges from 0.2 MPa to 130 MPa. This will ensure that the film 23 will detect both the smallest and largest possible pressures and forces experienced during manufacture and installation of fiber optic cables. Examples of films that can be used in the present invention are Fuji Prescale Films, LLLW—Ultra Super Low Pressure, from 0.2 to 0.6 MPa, LLW—Super Low Pressure, LW—Low Pressure, MW and MS—Medium Pressure, HS—High Pressure (typical size is 270 mm wide and 4 to 10 meters in length); PSI Sensor Products Inc., Tactile Pressure Measuring Films; and Pressurex films of 4 to 6 mils thick, used in conjunction with the Pressurex-Micro Imaging System. However, this invention is not limited to using these companies products, and can use any commercially available pressure sensitive or tactile film. In the preferred embodiment, the thickness of the film is to be within the range of 0.05 mm to 0.50 mm.

The film strips or sections can be of any width and length, depending on availability and manufacturing optimization. The film sections used can be of equal width and length in a cable, or can be of different widths and lengths within a cable. Additionally, the spacing of the film sections is not critical and can be governed by material availability and manufacturing needs. The spacing of the film sections can be even both radially around the cable and along the length of the cable, or the spacing can be uneven both radially and along the length of the cable without adversely affecting the film performance.

Figure 3:
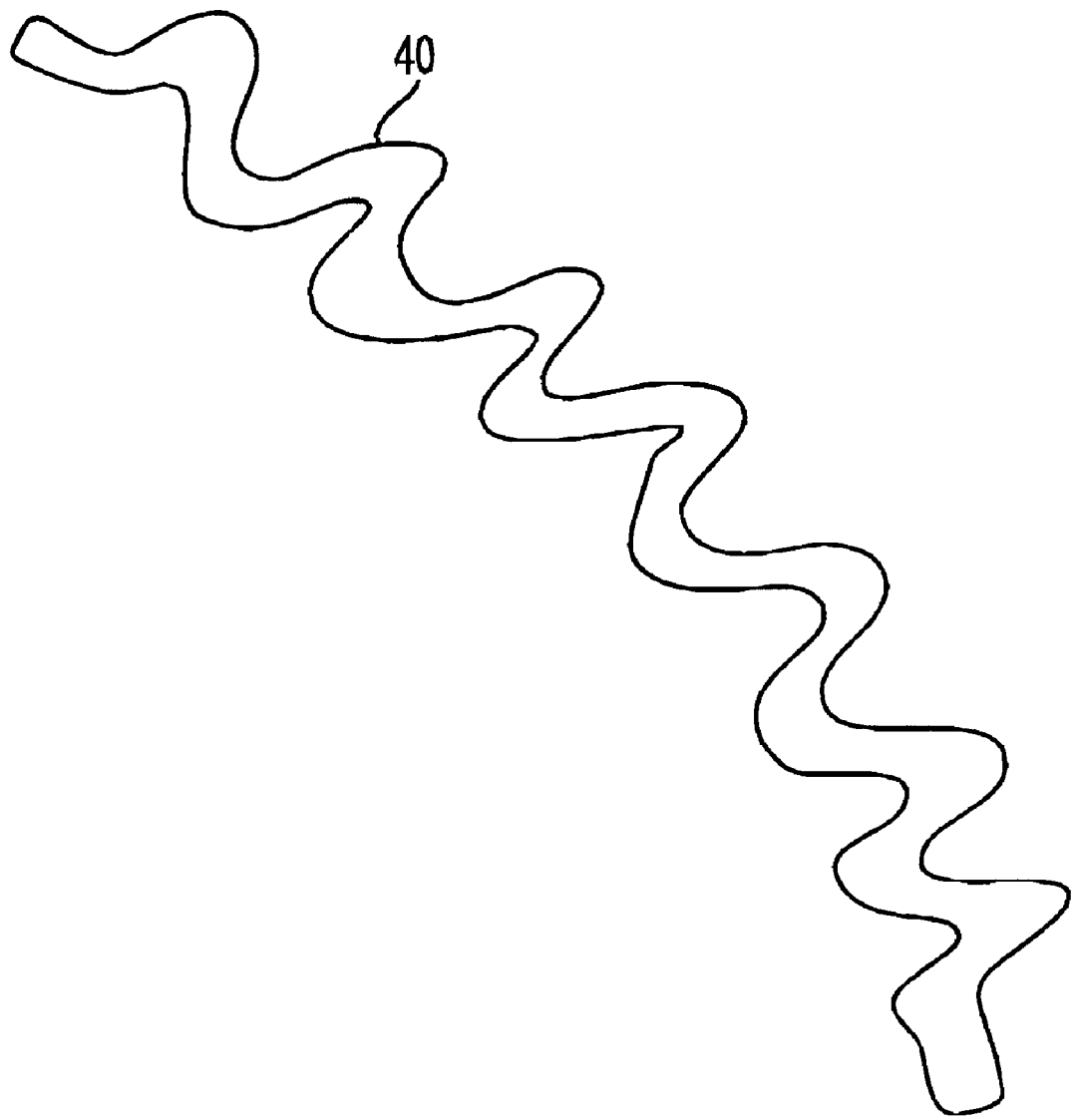
FIG. 3 is a cross-sectional view of a corrugated tactile or pressure sensitive film.

Further, in the preferred embodiment the film 23 is "corrugated" or made with ridges and valleys along the length of the film 23. An example of this in FIG. 3 shows the crosssection of one embodiment of a corrugated film 40. The number and width or frequency of the peaks and valleys can vary per each film used in a cable to optimize the characteristics and aspects of the films used. The "corrugation" of the films 40 greatly increases their sensitivity to the loads experienced during manufacture or installation.

Figure 4:
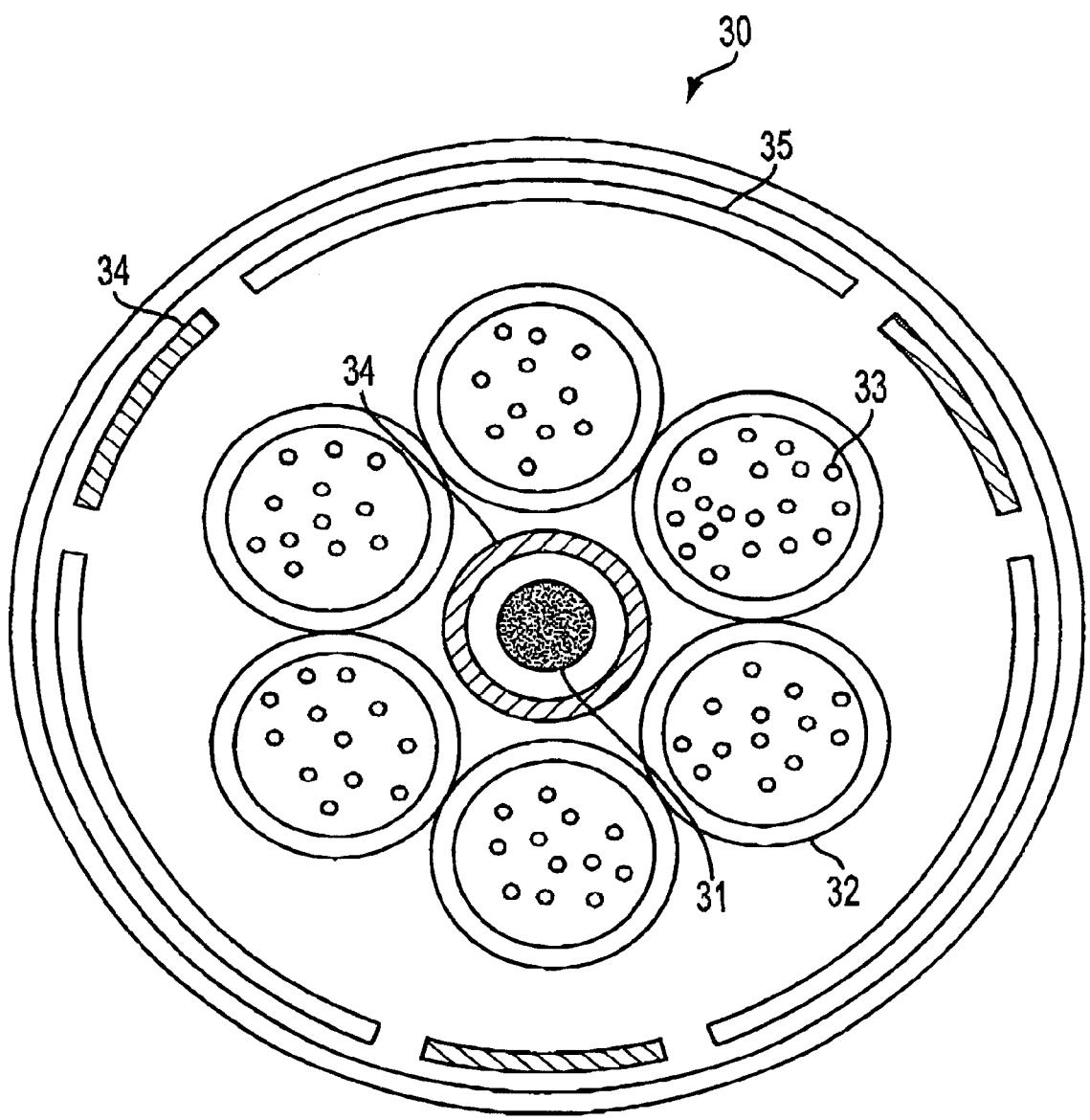
FIG. 4 is a cross-sectional view of a different fiber optic cable made with six buffer tubes.

FIG. 4, shows another embodiment of the present invention in another cable structure. In this embodiment the cable 30 has a glass reinforced center member 31, surrounded by six buffer tubes 32, each of which has a number of optical fibers 33. The cable 30 also has water absorbing tape 34, also known as swelling tape. This tape 34 absorbs moisture that enters the cable 30 preventing the moisture from propagating along the cable length and thus damaging the fibers or cable structure. Finally, a plurality of tactile or pressure sensitive film strips 35 are placed circumferentially around the cable, located between the outer jacket 36 and the buffer tubes 32.

In another embodiment (not shown), tactile films are wrapped around the buffer tubes and central strength member.

Further, as it is necessary to see the color changes, if any, in the films the outer jacket of the cables made in accordance with this invention should be made from materials which allow one to see the color changes in the film or films used. In the preferred embodiment, the outer jacket is completely transparent so as to allow a clear view of the film to see any color change in the films.

It is of course understood that departures can be made from the preferred embodiments of the invention by those of ordinary skill in the art without departing from the spirit and scope of the invention that is limited only by the following claims.

We claim:

1. A fiber optical cable, comprising:
   at least one optical fiber;

an outer jacket; and a plurality of color-changing pressure sensitive films positioned between said at least one optical fiber and said outer jacket, wherein said pressure sensitive films change color under stress.

2. The optical fiber according to claim 1, wherein at least one of said color-changing pressure sensitive films is of smooth or corrugated shape.

3. The optical fiber according to claim 1, wherein said outer jacket is transparent.

4. The optical fiber according to claim 1, further comprising at least one buffer tube, wherein said at least one optical fibers is disposed in said buffer tube, and said plurality of color changing pressure sensitive films are positioned between said at least one buffer tube and said outer jacket.

5. The optical fiber according to claim 1, wherein said plurality of color changing pressure sensitive films are located at periodic intervals along the length of the fiber optic cable.

6. The fiber optic cable according to claim 1, wherein said plurality of color changing pressure sensitive films are of the same width and length.

7. The fiber optic cable according to claim 1, wherein said plurality of color changing pressure sensitive films are spaced evenly radially around the fiber optic cable.

8. The fiber optic cable according to claim 1, wherein said plurality of color changing pressure sensitive films are spaced evenly along the length of the fiber optic cable.

9. The fiber optic cable according to claim 1, wherein said plurality of color changing pressure sensitive films are spaced evenly along the length of and radially around the fiber optic cable.

10. A fiber optical cable, comprising:

an outer jacket;

at least one buffer tube;

at least one optical fiber, disposed in said at least one buffer tube; and a plurality of color-changing pressure sensitive films positioned between said at least one optical fiber and said outer jacket, wherein said pressure sensitive films change color under stress;

wherein said plurality of color changing pressure sensitive films are located at periodic intervals throughout the fiber optic cable.

11. The fiber optic cable according to claim 10, wherein said plurality of color changing pressure sensitive films are corrugated.

12. The fiber optic cable according to claim 10, wherein said outer jacket is transparent.

13. The fiber optic cable according to claim 10, wherein said plurality of color changing pressure sensitive films are of the same width and length.

14. The fiber optic cable according to claim 10, wherein said plurality of color changing pressure sensitive films are spaced evenly radially around the fiber optic cable.

15. The fiber optic cable according to claim 10, wherein said plurality of color changing pressure sensitive films are spaced evenly along the length of the fiber optic cable.

16. The fiber optic cable according to claim 10, wherein said plurality of color changing pressure sensitive films are spaced evenly along the length of and radially around the fiber optic cable.

17. A fiber optic cable, comprising:

at least one optical fiber;

an outer jacket; and a pressure sensitive film positioned between said at least one optical fiber and said outer jacket, wherein said pressure sensitive film is corrugated and changes color under stress.

18. A fiber optical cable, comprising:

an outer jacket;

at least one buffer tube;

at least one optical fiber, disposed in said at least one buffer tube; and a color-changing pressure sensitive film positioned between said at least one optical fiber and said outer jacket, wherein said pressure sensitive film is corrugated and changes color under stress.

19. A fiber optic cable, comprising:

an outer jacket;

at least one buffer tube, disposed in said outer jacket;

at least one optical fiber, disposed in said at least one buffer tube; and a central strength member, disposed in said outer jacket adjacent to said at least one buffer tube;

wherein a color-changing pressure sensitive film is wrapped around both said central strength member and said at least one buffer tube, wherein said pressure sensitive film changes color under stress.

20. The optical fiber according to claim 19, wherein said pressure sensitive film is corrugated.

21. A fiber optic cable, comprising:

an outer jacket;

at least one buffer tube, disposed in said outer jacket;

at least one optical fiber, disposed in said at least one buffer tube; and a central strength member, disposed in said outer jacket adjacent to said at least one buffer tube;

wherein a plurality of color-changing pressure sensitive films are wrapped around both said central strength member and said at least one buffer tube, wherein said pressure sensitive films change color under stress.

22. The optical fiber according to claim 19, wherein at least one of said pressure sensitive films is corrugated.

* * * * *